United States Patent
Alverson et al.

(10) Patent No.: US 12,218,828 B2
(45) Date of Patent: Feb. 4, 2025

(54) SYSTEM AND METHOD FOR FACILITATING EFFICIENT PACKET FORWARDING IN A NETWORK INTERFACE CONTROLLER (NIC)

(71) Applicant: Hewlett Packard Enterprise Development LP, Houston, TX (US)

(72) Inventors: Robert Alverson, Seattle, WA (US); Partha Pratim Kundu, Palo Alto, CA (US); Duncan Roweth, Bristol (GB); David Charles Hewson, Bristol (GB); Albert SauPong Cheng, Bellevue, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 59 days.

(21) Appl. No.: 17/594,638

(22) PCT Filed: Mar. 23, 2020

(86) PCT No.: PCT/US2020/024262
§ 371 (c)(1),
(2) Date: Oct. 25, 2021

(87) PCT Pub. No.: WO2020/236284
PCT Pub. Date: Nov. 26, 2020

(65) Prior Publication Data
US 2022/0311544 A1    Sep. 29, 2022

Related U.S. Application Data

(60) Provisional application No. 62/852,289, filed on May 23, 2019, provisional application No. 62/852,203, (Continued)

(51) Int. Cl.
*H04L 45/28* (2022.01)
*G06F 9/50* (2006.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
None
See application file for complete search history.

(56) References Cited

U.S. PATENT DOCUMENTS

| | | |
|---|---|---|
| 4,807,118 A | 2/1989 | Lin et al. |
| 5,138,615 A | 8/1992 | Lamport et al. |

(Continued)

FOREIGN PATENT DOCUMENTS

| | | |
|---|---|---|
| CN | 101729609 A | 6/2010 |
| CN | 102932203 A | 2/2013 |

(Continued)

OTHER PUBLICATIONS

Awerbuch, B., et al.; "An On-Demand Secure Routing Protocol Resilient to Byzantine Failures"; Sep. 2002; 10 pages.

(Continued)

*Primary Examiner* — Chirag G Shah
*Assistant Examiner* — Suk Jin Kang
(74) *Attorney, Agent, or Firm* — Dickinson Wright

(57) ABSTRACT

A network interface controller (NIC) capable of efficient packet forwarding is provided. The NIC can be equipped with a host interface, a packet generation logic block, and a forwarding logic block. During operation, the packet generation logic block can obtain, via the host interface, a message from the host device and for a remote device. The packet generation logic block may generate a plurality of packets for the remote device from the message. The forwarding logic block can then send a first subset of packets of the plurality of packets based on ordered delivery. If a first condition is met, the forwarding logic block can send a (Continued)

second subset of packets of the plurality of packets based on unordered delivery. Furthermore, if a second condition is met, the forwarding logic block can send a third subset of packets of the plurality of packets based on ordered delivery.

20 Claims, 9 Drawing Sheets

Related U.S. Application Data filed on May 23, 2019, provisional application No. 62/852,273, filed on May 23, 2019.

(51) Int. Cl.

| | | |
|---|---|---|
| *G06F 9/54* | (2006.01) |
| *G06F 12/0862* | (2016.01) |
| *G06F 12/1036* | (2016.01) |
| *G06F 12/1045* | (2016.01) |
| *G06F 13/14* | (2006.01) |
| *G06F 13/16* | (2006.01) |
| *G06F 13/28* | (2006.01) |
| *G06F 13/38* | (2006.01) |
| *G06F 13/40* | (2006.01) |
| *G06F 13/42* | (2006.01) |
| *G06F 15/173* | (2006.01) |
| *H04L 1/00* | (2006.01) |
| *H04L 43/0876* | (2022.01) |
| *H04L 43/10* | (2022.01) |
| *H04L 45/00* | (2022.01) |
| *H04L 45/02* | (2022.01) |
| *H04L 45/021* | (2022.01) |
| *H04L 45/028* | (2022.01) |
| *H04L 45/12* | (2022.01) |
| *H04L 45/122* | (2022.01) |
| *H04L 45/125* | (2022.01) |
| *H04L 45/16* | (2022.01) |
| *H04L 45/24* | (2022.01) |
| *H04L 45/42* | (2022.01) |
| *H04L 45/745* | (2022.01) |
| *H04L 45/7453* | (2022.01) |
| *H04L 47/10* | (2022.01) |
| *H04L 47/11* | (2022.01) |
| *H04L 47/12* | (2022.01) |
| *H04L 47/122* | (2022.01) |
| *H04L 47/20* | (2022.01) |
| *H04L 47/22* | (2022.01) |
| *H04L 47/24* | (2022.01) |
| *H04L 47/2441* | (2022.01) |
| *H04L 47/2466* | (2022.01) |
| *H04L 47/2483* | (2022.01) |
| *H04L 47/30* | (2022.01) |
| *H04L 47/32* | (2022.01) |
| *H04L 47/34* | (2022.01) |
| *H04L 47/52* | (2022.01) |
| *H04L 47/62* | (2022.01) |
| *H04L 47/625* | (2022.01) |
| *H04L 47/6275* | (2022.01) |
| *H04L 47/629* | (2022.01) |
| *H04L 47/76* | (2022.01) |
| *H04L 47/762* | (2022.01) |
| *H04L 47/78* | (2022.01) |
| *H04L 47/80* | (2022.01) |
| *H04L 49/00* | (2022.01) |
| *H04L 49/101* | (2022.01) |
| *H04L 49/15* | (2022.01) |
| *H04L 49/90* | (2022.01) |
| *H04L 49/9005* | (2022.01) |
| *H04L 49/9047* | (2022.01) |
| *H04L 67/1097* | (2022.01) |
| *H04L 69/22* | (2022.01) |
| *H04L 69/28* | (2022.01) |
| *H04L 69/40* | (2022.01) |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |

(56) References Cited

U.S. PATENT DOCUMENTS

| | | |
|---|---|---|
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweva et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 * | 10/2008 | Biran ............... G06F 13/28 709/212 |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,804,741 B2 * | 8/2014 | Bennett ............... H04L 47/193 370/473 |
| 8,811,183 B1 | 8/2014 | Anand et al. |
| 8,948,175 B2 | 2/2015 | Bly et al. |
| 8,971,345 B1 | 3/2015 | McCanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,444,769 B1 * | 9/2016 | Eiriksson ............. H04L 69/324 |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | McKelvie et al. |
| 10,169,060 B1 | 1/2019 | Mncent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | MacNamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 10,880,204 B1 * | 12/2020 | Shalev ................. H04L 47/365 |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 * | 9/2022 | Stawitzky ............... H04L 47/32 |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0129039 A1 * | 6/2005 | Biran .................. H04L 67/1097 709/250 |
| 2005/0132017 A1 * | 6/2005 | Biran .................. G06F 13/28 709/212 |
| 2005/0144310 A1 * | 6/2005 | Biran .................. H04L 69/16 709/250 |
| 2005/0152274 A1 | 7/2005 | Simpson |
| 2005/0182854 A1 * | 8/2005 | Pinkerton ............ H04L 69/16 709/238 |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 | 9/2007 | Oshikiri et al. |
| 2007/0242611 A1 | 10/2007 | Archer et al. |

(56) References Cited

U.S. PATENT DOCUMENTS

| | | |
|---|---|---|
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0147881 A1 | 6/2008 | Krishnamurthy et al. |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1* | 7/2010 | Gupta .................. H04L 1/1685 714/748 |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1* | 3/2011 | Bestler ................ H04L 67/1097 711/E12.001 |
| 2011/0072179 A1 | 3/2011 | Lacroute et al. |
| 2011/0099243 A1* | 4/2011 | Keels .................... H04L 49/90 709/212 |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1* | 1/2013 | Regula .................... H04L 49/45 370/254 |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Iu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | McDaniel et al. |
| 2014/0133292 A1 | 5/2014 | Yamatsu et al. |
| 2014/0136646 A1 | 5/2014 | Tamir et al. |
| 2014/0164471 A1* | 6/2014 | Keels .................. H04L 49/9094 709/201 |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0359044 A1* | 12/2014 | Davis .................... H04L 49/25 709/213 |
| 2014/0362698 A1 | 12/2014 | Arad |
| 2014/0369360 A1 | 12/2014 | Carlstrom |
| 2014/0379847 A1* | 12/2014 | Williams ............ H04L 67/1097 709/216 |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1* | 8/2015 | Swartzentruber ....... H04L 69/22 370/394 |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |
| 2016/0154756 A1* | 6/2016 | Dodson ................ G06F 13/4022 710/316 |
| 2016/0182383 A1 | 6/2016 | Pedersen |
| 2016/0205023 A1 | 7/2016 | Janardhanan |

(56) References Cited

U.S. PATENT DOCUMENTS

| | | |
|---|---|---|
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | Santos et al. |
| 2016/0381189 A1* | 12/2016 | Caulfield ................ H04L 49/30 370/389 |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1* | 4/2017 | Pettit ....................... H04L 67/10 |
| 2017/0118098 A1 | 4/2017 | Littlejohn et al. |
| 2017/0153852 A1 | 6/2017 | Ma et al. |
| 2017/0177541 A1 | 6/2017 | Berman et al. |
| 2017/0220500 A1 | 8/2017 | Tong |
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Ku et al. |
| 2017/0371778 A1 | 12/2017 | McKelvie et al. |
| 2018/0004705 A1* | 1/2018 | Menachem ......... H04L 67/1097 |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0363989 A1* | 11/2019 | Shalev ................... H04L 69/22 |
| 2019/0379610 A1 | 12/2019 | Srinivasan et al. |
| 2020/0036644 A1* | 1/2020 | Belogolovy .......... H04L 1/0014 |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1* | 8/2020 | Humphrey ............ G06F 9/4856 |
| 2020/0274832 A1* | 8/2020 | Humphrey ............. G06F 9/545 |
| 2020/0334195 A1* | 10/2020 | Chen ...................... H04L 47/34 |
| 2020/0349098 A1 | 11/2020 | Caulfield et al. |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1* | 9/2022 | Shalev ................... H04L 49/90 |
| 2022/0309025 A1* | 9/2022 | Chen .................... H04L 47/622 |
| 2023/0035420 A1 | 2/2023 | Sankaran et al. |
| 2023/0046221 A1* | 2/2023 | Pismenny ............. H04L 47/34 |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |

(56) References Cited

FOREIGN PATENT DOCUMENTS

| | | | |
|---|---|---|---|
| WO | 2005/094487 | A2 | 10/2005 |
| WO | 2007/034184 | A2 | 3/2007 |
| WO | 2009/010461 | A2 | 1/2009 |
| WO | 2009/018232 | A1 | 2/2009 |
| WO | 2014/092780 | A1 | 6/2014 |
| WO | 2014/137382 | A1 | 9/2014 |
| WO | 2014/141005 | A1 | 9/2014 |
| WO | 2018/004977 | A1 | 1/2018 |
| WO | 2018/046703 | A1 | 3/2018 |
| WO | 2019/072072 | A1 | 4/2019 |

OTHER PUBLICATIONS

Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.
Bhatele, A., et al.; "Analyzing Network Health and Congestion in Dragonfly-based Supercomputers"; May 23-27, 2016; 10 pages.
Blumrich, M.A., et al.; "Exploiting Idle Resources in a High-Radix Switch for Supplemental Storage"; Nov. 2018; 13 pages.
Chang, F., et al.; "PVW: Designing Vir PVW: Designing Virtual World Ser orld Server Infr er Infrastructur astructure"; 2010; 8 pages.
Chang, F., et al.; "PVW: Designing Virtual World Server Infrastructure"; 2010; 8 pages.
Chen, F., et al.; "Requirements for RoCEv3 Congestion Management"; Mar. 21, 2019; 8 pages.
Cisco Packet Tracer; "packet-tracer;—ping"; https://www.cisco.com/c/en/US/td/docs/security/asa/asa-command-reference/I-R/cmdref2/p1.html; 2017.
Cisco; "Understanding Rapid Spanning Tree Protocol (802.1w)"; Aug. 1, 2017; 13 pages.
Eardley, Ed, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network For Data Centers"; Nov. 7, 2017; 15 pages.
International Search Report and Written Opinion received for PCT Application No. PCT/US2020/024248, mailed on Jul. 8, 2020, 11 pages.
International Search Report and Written Opinion received for PCT Application No. PCT/US20/024332, mailed on Jul. 8, 2020, 13 pages.
International Search Report and Written Opinion received for PCT Application No. PCT/US20/24243, mailed on July 9. 2020, 10 pages.
International Search Report and Written Opinion received for PCT Application No. PCT/US20/24253, mailed on July 6. 2020, 12 pages.
International Search Report and Written Opinion received for PCT Application No. PCT/US20/24256, mailed on July 7. 2020, 11 pages.
International Search Report and Written Opinion received for PCT Application No. PCT/US20/24257, mailed on Jul. 7, 2020, 10 pages.
International Search Report and Written Opinion received for PCT Application No. PCT/US20/24258, mailed on Jul. 7, 2020, 9 pages.
International Search Report and Written Opinion received for PCT Application No. PCT/US20/24259, mailed on July 9. 2020, 13 pages.
International Search Report and Written Opinion received for PCT Application No. PCT/US20/24260, mailed on July 7. 2020, 11 pages.
International Search Report and Written Opinion received for PCT Application No. PCT/US20/24268, mailed on July 9. 2020, 11 pages.
International Search Report and Written Opinion received for PCT Application No. PCT/US20/24269, mailed on July 9. 2020, 11 pages.
International Search Report and Written Opinion received for PCT Application No. PCT/US20/24339, mailed on Jul. 8, 2020, 11 pages.
International Search Report and Written Opinion received for PCT Application No. PCT/US2020/024125, mailed on Jul. 10, 2020, 5 pages.
International Search Report and Written Opinion received for PCT Application No. PCT/US2020/024129, mailed on Jul. 10, 2020, 11 pages.
International Search Report and Written Opinion received for PCT Application No. PCT/US2020/024237, mailed on Jul. 14, 2020, 5 pages.
International Search Report and Written Opinion received for PCT Application No. PCT/US2020/024239, mailed on Jul. 14, 2020, 11 pages.
International Search Report and Written Opinion received for PCT Application No. PCT/US2020/024241, mailed on Jul. 14, 2020, 13 pages.
International Search Report and Written Opinion received for PCT Application No. PCT/US2020/024242, mailed on Jul. 6, 2020, 11 pages.
International Search Report and Written Opinion received for PCT Application No. PCT/US2020/024244, mailed on Jul. 13, 2020, 10 pages.
International Search Report and Written Opinion received for PCT Application No. PCT/US2020/024245, mailed on Jul. 14, 2020, 11 pages.
International Search Report and Written Opinion received for PCT Application No. PCT/US2020/024246, mailed on Jul. 14, 2020, 10 pages.
International Search Report and Written Opinion received for PCT Application No. PCT/US2020/024250, mailed on Jul. 14, 2020, 12 pages.
International Search Report and Written Opinion received for PCT Application No. PCT/US2020/024254, mailed on Jul. 13, 2020, 10 pages.
International Search Report and Written Opinion received for PCT Application No. PCT/US2020/024266, mailed on Jul. 9, 2020, 10 pages.
International Search Report and Written Opinion received for PCT Application No. PCT/US2020/024270, mailed on Jul. 10, 2020, 13 pages.
International Search Report and Written Opinion received for PCT Application No. PCT/US2020/024271, mailed on Jul. 9, 2020, 10 pages.
International Search Report and Written Opinion received for PCT Application No. PCT/US2020/024272, mailed on Jul. 9, 2020, 10 pages.
International Search Report and Written Opinion received for PCT Application No. PCT/US2020/024276, mailed on Jul. 13, 2020, 9 pages.
International Search Report and Written Opinion received for PCT Application No. PCT/US2020/024304, mailed on Jul. 15, 2020, 11 pages.
International Search Report and Written Opinion received for PCT Application No. PCT/US2020/024311, mailed on Jul. 17, 2020, 8 pages.
International Search Report and Written Opinion received for PCT Application No. PCT/US2020/024321, mailed on Jul. 9, 2020, 9 pages.
International Search Report and Written Opinion received for PCT Application No. PCT/US2020/024324, mailed on Jul. 14, 2020, 10 pages.
International Search Report and Written Opinion received for PCT Application No. PCT/US2020/024327, mailed on Jul. 10, 2020, 15 pages.

(56) References Cited

OTHER PUBLICATIONS

International Search Report and Written Opinion received for PCT Application No. PCT/US2020/24158, mailed on Jul. 6, 2020, 18 pages.
International Search Report and Written Opinion received for PCT Application No. PCT/US2020/24251, mailed on Jul. 6, 2020, 11 pages.
International Search Report and Written Opinion received for PCT Application No. PCT/US2020/24267, mailed on Jul. 6, 2020, 9 pages.
International Search Report and Written Opinion received for PCT Patent Application No. PCT/US20/24303, mailed on Oct. 21, 2020, 9 pages.
International Search Report and Written Opinion received for PCT Application No. PCT/US2020/024262, mailed on Jul. 13, 2020, 10 pages.
Ramakrishnan et al, RFC 3168, "The addition of Explicit Congestion Notification (ECN) to IP", Sep. 2001 (Year: 2001).
International Search Report and Written Opinion received for PCT Patent Application No. PCT/US20/24340, mailed on Oct. 26, 2020, 9 pages.
International Search Report and Written Opinion received for PCT Patent Application No. PCT/US20/24342, mailed on Oct. 27, 2020, 10 pages.
International Search Report and Written Opinion received for PCT Patent Application No. PCT/US2020/024192, mailed on Oct. 23, 2020, 9 pages.
International Search Report and Written Opinion received for PCT Patent Application No. PCT/US2020/024221, mailed on Oct. 26, 2020, 9 pages.
International Search Report cited in PCT/US2020/024170 mailed Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A.R., et al.; "Efficient Barrier and Allreduce on Infiniband clusters using multicast and adaptive algorithms"; Sept. 20-23, 2004; 10 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.
Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al.; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al.; "Deadlock-Free Broadcast Routing in Dragonfly Networks without Virtual Channels", submission to IEEE transactions on Parallel and Distributed Systems, 2015, 15 pages.
Extended European Search Report and Search Opinion received for EP Application No. 20809930.9, mailed on Mar. 2, 2023, 9 pages.
Extended European Search Report and Search Opinion received for EP Application No. 20810784.7, mailed on Mar. 9, 2023, 7 pages.

\* cited by examiner

SYSTEM AND METHOD FOR FACILITATING EFFICIENT PACKET FORWARDING IN A NETWORK INTERFACE CONTROLLER (NIC)

CROSS REFERENCE TO RELATED APPLICATIONS

This application is a 371 National Stage Entry of PCT/US2020/024262, filed on Mar. 23, 2020, which claims the benefit of and priority to U.S. Provisional Patent Application No. 62/852,203, filed on May 23, 2019; U.S. Provisional Patent Application No. 62/852,273, filed on May 23, 2019; and U.S. Provisional Patent Application No. 62/852,289, filed on May 23, 2019; the contents of which are incorporated herein by reference in their entirety.

BACKGROUND

Field

This is generally related to the technical field of networking. More specifically, this disclosure is related to systems and methods for facilitating efficient packet forwarding in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficient packet forwarding is provided. The NIC can be equipped with a host interface, a packet generation logic block, and a forwarding logic block. The host interface may couple a host device. During operation, the packet generation logic block can obtain, via the host interface, a message from the host device and for a remote device. The packet generation logic block may generate a plurality of packets for the remote device from the message. The forwarding logic block can then send a first subset of packets of the plurality of packets based on ordered delivery. If a first condition is met, the forwarding logic block can send a second subset of packets of the plurality of packets based on unordered delivery. Furthermore, if a second condition is met, the forwarding logic block can send a third subset of packets of the plurality of packets based on ordered delivery.

BRIEF DESCRIPTION OF THE FIGURES

In the figures, like reference numerals refer to the same figure elements.

DETAILED DESCRIPTION

Figure 1:
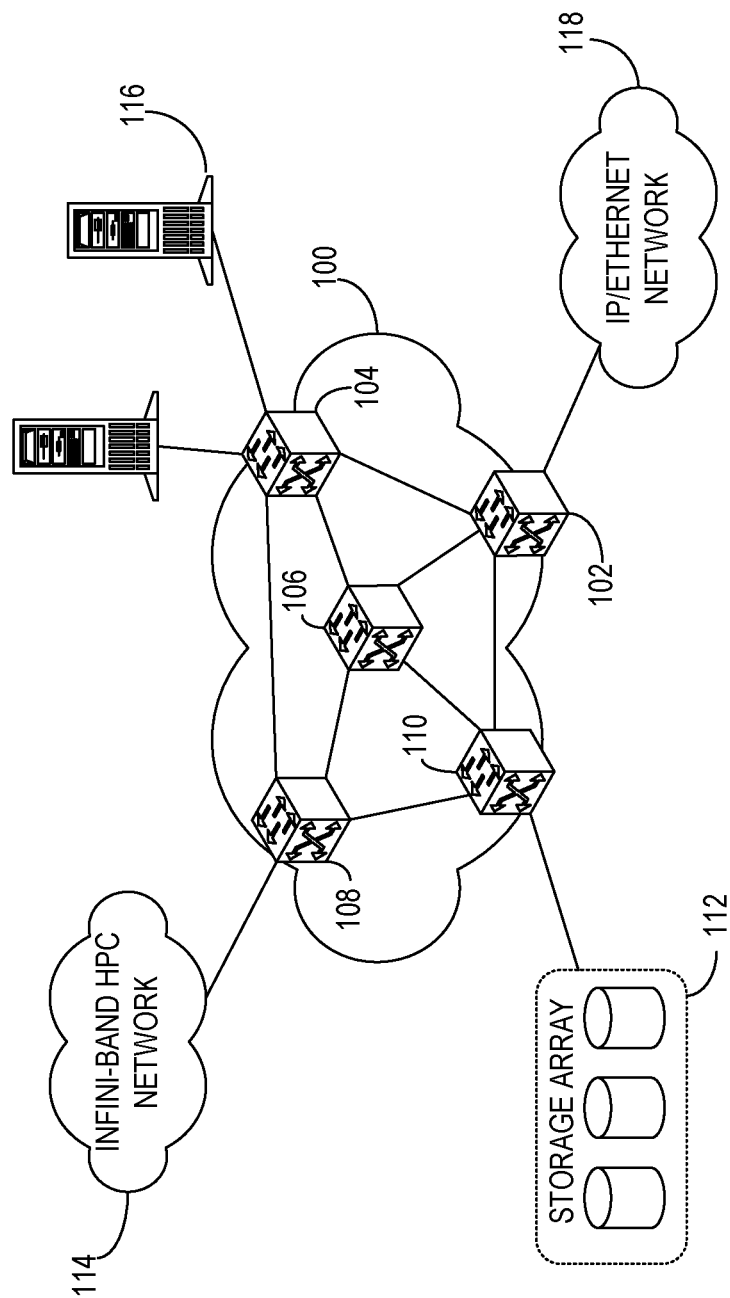
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient packet forwarding in a network interface controller (NIC). The NIC allows a host to communicate with a data-driven network. The network can accommodate dynamic data traffic with fast, effective congestion control by maintaining state information of individual packet streams. More specifically, packets injected into the network of switches can be categorized into streams, which can be mapped to their layer-2, layer-3, or other protocol-specific header information. Each stream can be marked by a distinctive identifier that is local to an input port of a switch, and provided with a stream-specific input buffer so that each stream can be individually flow-controlled. In addition, packets of a respective stream can be acknowledged upon reaching the egress point of the network, and the acknowledgment packets can be sent back to the ingress point of the stream along the same data path in the reverse direction. As a result, each switch can obtain state information of active packet streams it is forwarding and can perform highly responsive, stream-specific flow control. Such flow control can allow the network to operate at higher capacity while providing versatile traffic-engineering capabilities.

The embodiments described herein solve the problem of efficiently forwarding an ordered packet stream by (i) forwarding initial and final sets of packets in the stream in order, and (ii) switching to unordered forwarding for rest of the packets in the stream. In this way, the NIC can facilitate ordered delivery for the first and last packet(s) of the stream, and unordered delivery for the middle packets of the stream.

During operation, an application, which may run on a source device of a NIC, can issue a message indicating a data operation (e.g., a "GET" or a "PUT" command of remote direct memory access (RDMA)) for a memory location of a remote target device. The NICs of the source and target devices can be referred to as the source and target NICs, respectively. The operation can be an idempotent or a non-idempotent operation. An idempotent operation may be executed more than once without causing an error. On the other hand, a non-idempotent operation can be executed once. Executing a non-idempotent operation more than once may cause an error. Typically, if an idempotent RDMA operation is not completed, instead of the target NIC executing the operation, the software of the target device (e.g., an operating system) may replay the operation.

The message indicating the operation can be a large message that may be transmitted via a plurality of packets. The message semantics may require ordered delivery of the packets. For example, memory-access-related messages may require in-order delivery of packets. However, ordered delivery may incur significant overhead, such as transmission over a predetermined path, strict enforcement of in-order packet transmission, and packet drops for out-of-order packets, which can lead to inefficient data forwarding. Therefore, ordered delivery for a large message can adversely affect the performance.

To solve this problem, the source NIC can use both ordered and unordered packet delivery for the message to improve performance while preserving order at message boundaries. In particular, if the message is for an idempotent operation, the NIC may send some of the packets based on unordered delivery. During operation, the source NIC may receive a message larger than a maximum transmission unit (MTU). Accordingly, the source NIC can generate a plurality of packets from the message based on the MTU. Since the plurality of packets may include a portion of the message in their respective payloads, these packets can be referred to as a packet stream. The source NIC can then determine whether the size of the message (or the packets of the packet stream) is greater than a size threshold. In some embodiments, the size threshold can correspond to a size for which the transfer time is greater than twice the round-trip time (RTT) between the source and target NICs. The NIC can dynamically determine the threshold based on the RTT and the effective bandwidth. The NIC may measure the RTT and effective bandwidth based on the number and size of outstanding ordered packets when a first response returns to the NIC.

If the message size is greater than the size threshold, the source NIC can initiate an in-out-in (IOI) packet transfer for the packet stream. To facilitate IOI packet transfer, the source NIC can forward an initial set of packets with ordered delivery. Each of these packets can include a sequence number and an indicator indicating in-order delivery. The target NIC may receive one or more packets, and issue corresponding responses. A response can also be a cumulative response since these packets are ordered packets. However, since the responses may not be ordered, the source NIC may receive any of the responses. Based on the first received response, the source NIC can determine that all packets up to the sequence number of the response have been successfully received by the target NIC.

The source NIC can then switch to unordered delivery for the subsequent packets. When the number of remaining packets becomes less than a switchover threshold (i.e., the packets with the end of the message), the source NIC can switch back to ordered delivery. In some embodiments, the switchover threshold can indicate the number of outstanding packets. An outstanding packet is a packet for which the source NIC has not received a response yet. To further ensure that the last packet is delivered in order, the source NIC may refrain from sending the last packet of the packet stream until the source NIC has received responses for all unordered packets. In this way, the source NIC can use IOI packet transfer that can incorporate both ordered and unordered packet delivery, thereby facilitating efficient packet forwarding for large messages.

One embodiment of the present invention provides a NIC that can be equipped with a host interface, a packet generation logic block, and a forwarding logic block. The host interface may couple a host device. During operation, the packet generation logic block can obtain, via the host interface, a message from the host device and for a remote device. The packet generation logic block may generate a plurality of packets for the remote device from the message. The forwarding logic block can then send a first subset of packets of the plurality of packets based on ordered delivery. If a first condition is met, the forwarding logic block can send a second subset of packets of the plurality of packets based on unordered delivery. Furthermore, if a second condition is met, the forwarding logic block can send a third subset of packets of the plurality of packets based on ordered delivery.

In a variation on this embodiment, the packet generation logic block can determine that a size of the message is greater than a first threshold.

In a variation on this embodiment, triggering the first condition can include receiving, from the remote device, a response for one of the first subset of packets.

In a variation on this embodiment, triggering the second condition can include determining that a number of packets in the third subset of packets is less than a second threshold.

In a further variation, the second threshold indicates a number of outstanding packets in the first and second subsets of packets.

In a variation on this embodiment, the forwarding logic block can identify a final packet in the third subset of packets and refrain from sending the final packet until receiving respective responses for all packets in the second subset of packets.

In a variation on this embodiment, the first, second, and third subsets of packets can be sent in a non-overlapping sequence.

In a variation on this embodiment, the forwarding logic block can maintain a first counter indicating a number of outstanding packets in the first and third subsets of packets. The forwarding logic block can also maintain a second counter indicating a number of outstanding packets in the second subset of packets.

In a variation on this embodiment, the forwarding logic block can set a flag in a respective packet in the first and third subsets of packets. The flag can indicate that the ordered delivery of packets is required.

In a variation on this embodiment, the message corresponds to an RDMA command.

Figure 2A:
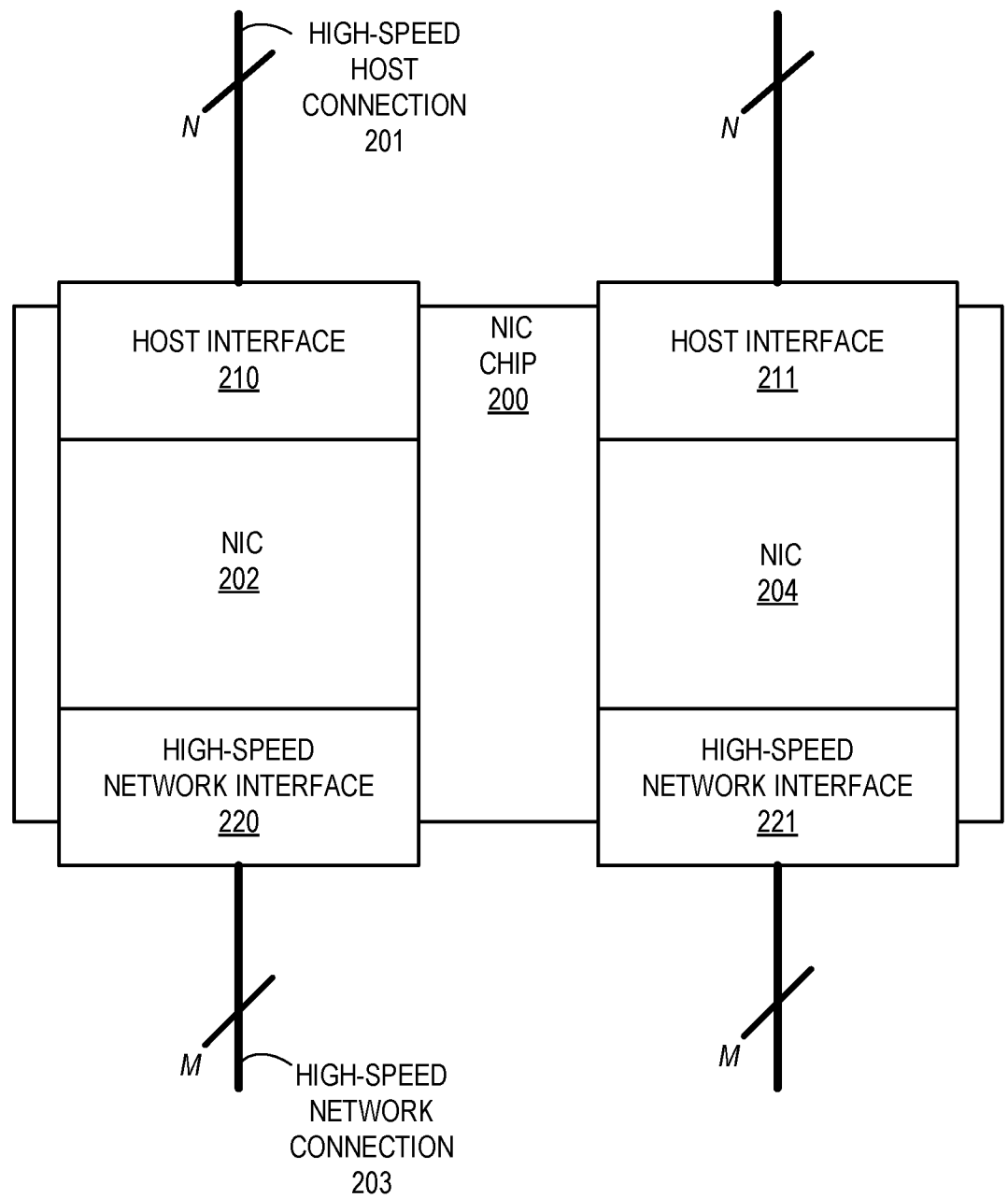
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient management of idempotent operations.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
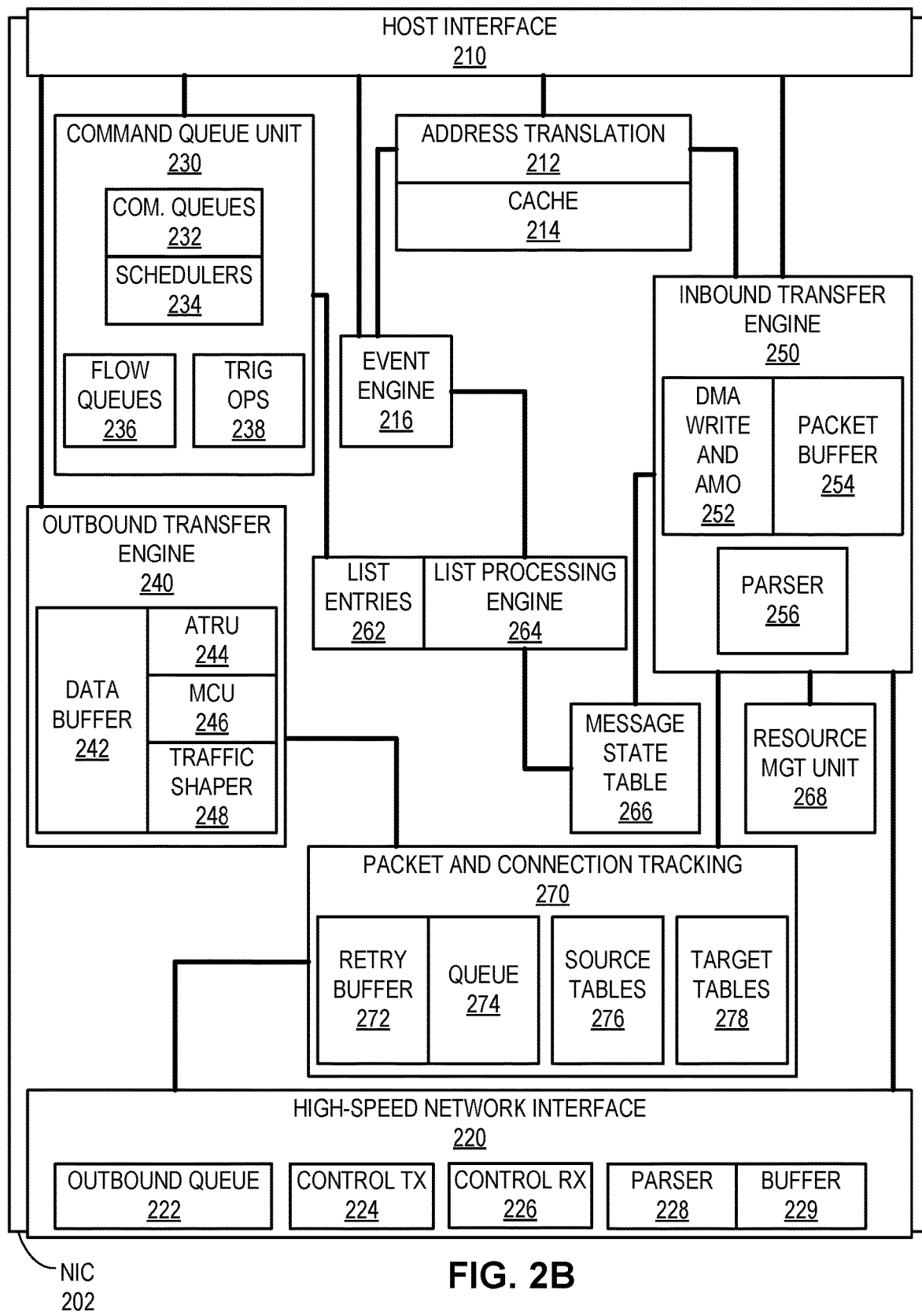
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Efficient Packet Forwarding in NIC

Figure 3A:
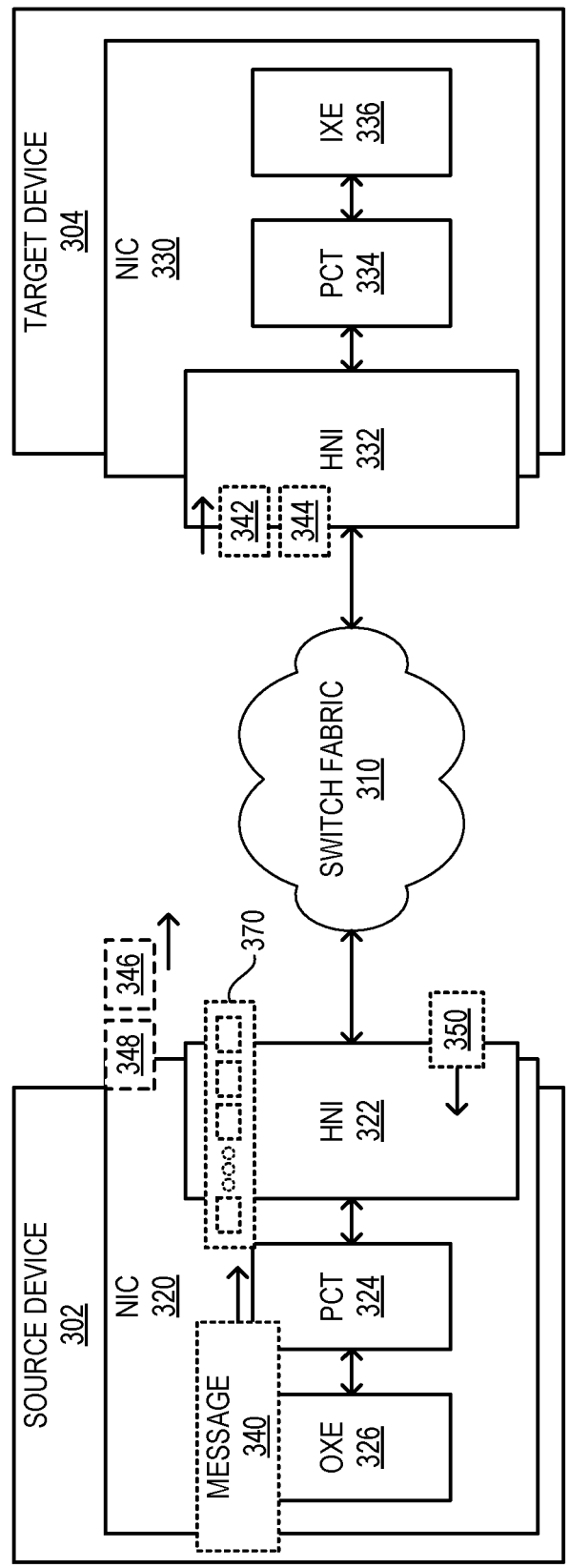
FIG. 3A shows an exemplary switchover to unordered packet forwarding in a NIC.

FIG. 3A shows an exemplary switchover to unordered packet forwarding in a NIC. In this example, devices 302 and 304 can be coupled with each other via switch fabric 310. Devices 302 and 304 can be equipped with NICs 320 and 330, respectively. HNIs 322 and 332 can couple NICs 320 and 330 to switch fabric 310, respectively. NIC 320 can be equipped with a PCT 324 and an OXE 326, and NIC 330 can be equipped with a PCT 334 and an IXE 336.

During operation, an application, which may run on device 320, can issue a message 340 that can indicate a data operation (e.g., an RDMA operation) for device 330. The size of message 340 can be larger than an MTU. Therefore, NIC 320 can generate a plurality of packets 370 from message 340 based on the MTU to sent message 340 across switch fabric 310. The semantics of message 340 may require ordered delivery of packets 370. For example, if message 340 involves a DMA operation, packets 370 may require in-order delivery. However, ordered delivery of packets 370 may incur significant overhead, such as transmission over a predetermined path in switch fabric 310, strict enforcement of in-order packet transmission from NIC 320, and packet drops for out-of-order packets at NIC 330. Therefore, ordered delivery for packets 370 can adversely affect the performance of the data transfer.

To solve this problem, NIC 320 can use both ordered and unordered delivery of packets 370 to improve performance while preserving order at the boundaries of message 340. Since each of packets 370 may include a portion of message 340 in their respective payloads, packets 370 can also be referred to as a packet stream 370. NIC 320 can then determine whether the size of message 340 (or the packets of packet stream 370) is greater than the size threshold. The size threshold can correspond to a size for which the transfer time is greater than twice the RTT via switch fabric 310. NIC 320 can dynamically adjust the size threshold based on the achieved bandwidth of the concurrent messages being forwarded by HNI 322 and the latency of the responses.

If the message size is greater than the size threshold, OXE 326 of NIC 320 can initiate an IOI packet transfer for packet stream 370. To facilitate IOI packet transfer, OXE 326 can forward an initial set of packets 342 and 344 with ordered delivery. Each of these packets can include a sequence number associated with message 340 and an indicator indicating that in-order delivery enforced. The respective headers of packets 342 and 344 can include Differentiated Services Code Point (DSCP) value that can indicate the ordered delivery.

For example, NIC 320 can set a flag in the headers to indicate that NIC 330 should check the sequence numbers in the headers of packets 342 and 344 to order them. Accordingly, when NIC 330 receives packets 342 and 344, NIC 330 can check the respective sequence numbers of packets 342 and 344, and process them in order. NIC 330 can also issue corresponding responses. A response can also be a cumulative response since these packets are ordered packets. However, since the responses may not be ordered, NIC 320 can receive any of the responses issued by NIC 330.

Suppose that NIC 320 receives a response 350, which can be a response to packet 344. Based on the sequence number of response 350, NIC 320 can determine that all packets up to packet 344, which are packets 342 and 344, have been received by NIC 330. Upon receiving response 350, PCT 324 can notify OXE 326 that all packets up to packet 344 have been received by NIC 330. Consequently, OXE 326 can switch to unordered delivery for subsequent packets 346 and 348.

In some embodiments, OXE 326 can maintain respective counters for ordered and unordered packets. For example, OXE 326 can increment the ordered packet counter (OPC) upon sending each of packets 342 and 344, and decrement the OPC upon receiving the notification from PCT 324 regarding response 350. Since response 350 can acknowledge both packets 342 and 344, response 350 can cause OXE 326 to decrement the OPC twice. OXE 326 can also maintain an unordered packet counter (UPC). OXE 326 can increment the UPC upon sending each of packets 346 and 348. Based on the OPC and UPC, OXE 326 can track the number of outstanding ordered and unordered packets, respectively.

Figure 3B:
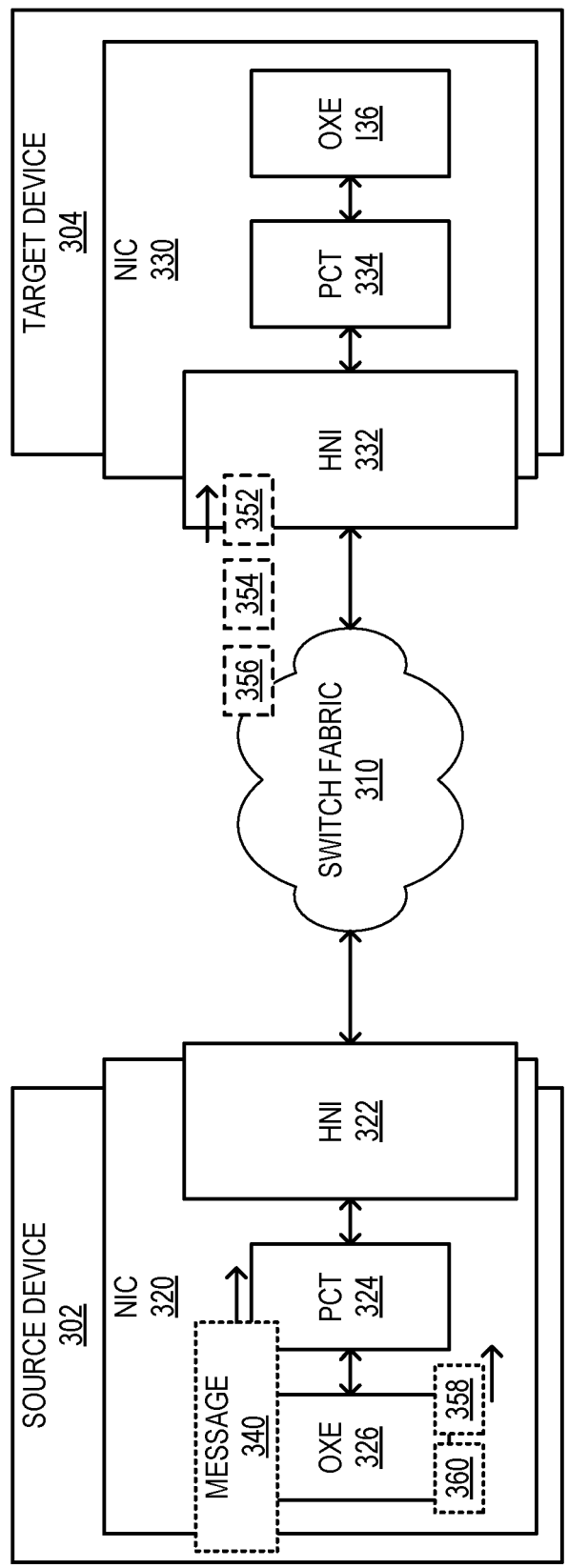
FIG. 3B shows an exemplary switchover to ordered packet forwarding in a NIC.

When the number of remaining packets becomes less than a switchover threshold, NIC 320 can switch back to ordered delivery. FIG. 3B shows an exemplary switchover to ordered packet forwarding in a NIC. If OXE 326 has sent outstanding unordered packets 452, 356, and 356, the value of UPC can be 3. On the other hand, OXE 326 can determine that message 340 have packets 358 and 360 remaining. Therefore, the number of remaining packets can be 2. Upon sending each unordered packet, OXE 326 can determine whether the number of remaining packets has become less than a switchover threshold. The switchover threshold can correspond to a combination (e.g., a summation) of the OPC and UPC values.

Upon sending packet 356, OXE 326 can determine that the number of remaining packets, which is 2 in this example, has become less the value of the UPC, which is 3 in this example. Consequently, OXE 326 can determine that remaining packets 358 and 360 correspond to the end of message 340. Therefore, OXE 326 can switch back to ordered delivery. Accordingly, OXE 326 can send packet 358 based on ordered delivery by setting the corresponding flag in the header of packet 358. When NIC 330 receives packet 358, NIC 330 determines that packet 358 requires ordered processing based on the flag. NIC 330 can then process the sequence number in the header of packet 358.

To further ensure that packet 360, which can be the last packet, is delivered in order, OXE 326 may refrain from sending packet 360 until NIC 320 receives responses for all unordered packets (i.e., the value of UPC becomes 0). OXE 326 can decrement the UPC for a response for each of packets 352, 354, and 356. As a result, the value of UPC can become 0, and OXE 326 can send packet 360. In this way, NIC 320 can use RN packet transfer that can incorporate both ordered and unordered packet delivery, thereby facilitating efficient packet forwarding for messages 340.

Figure 4A:
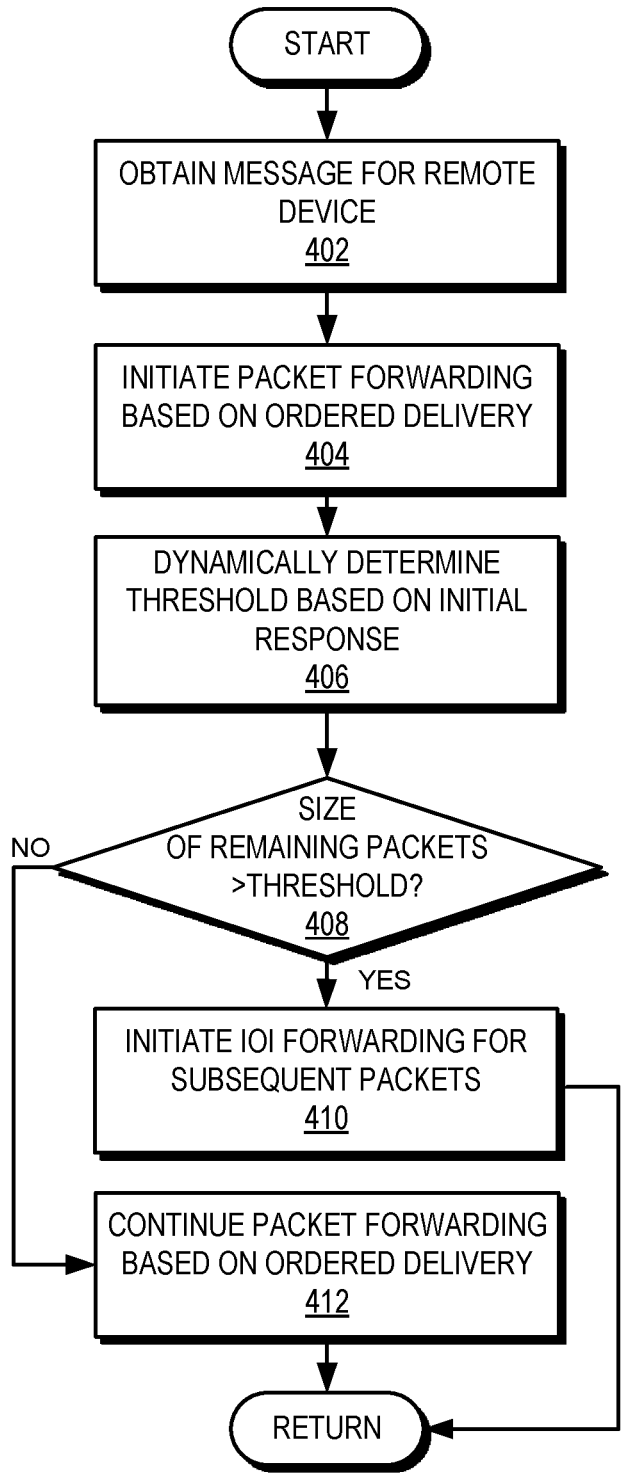
FIG. 4A shows a flow chart of a message selection process for in-out-in (IOI) packet forwarding in a NIC.

FIG. 4A shows a flow chart of a message selection process for in-out-in (IOI) packet forwarding in a NIC. During operation, the NIC may obtain a message for a remote device (operation 402) and indicate packet forwarding for the message based on ordered delivery (operation 404). The NIC can then dynamically determine a threshold based on the initial response (e.g., the first response received at the NIC) (operation 406) and determine whether the size of the remaining packets is greater than the threshold (operation 408). Since the IOI has not been triggered yet, the remaining packets can still be considered as ordered packets. If the size is greater than the threshold, the NIC can initiate IOI forwarding for the subsequent packets (operation 410). On the other hand, if the size is less than or equal to the threshold, the NIC can continue packet forwarding based on ordered delivery (operation 412).

Figure 4B:
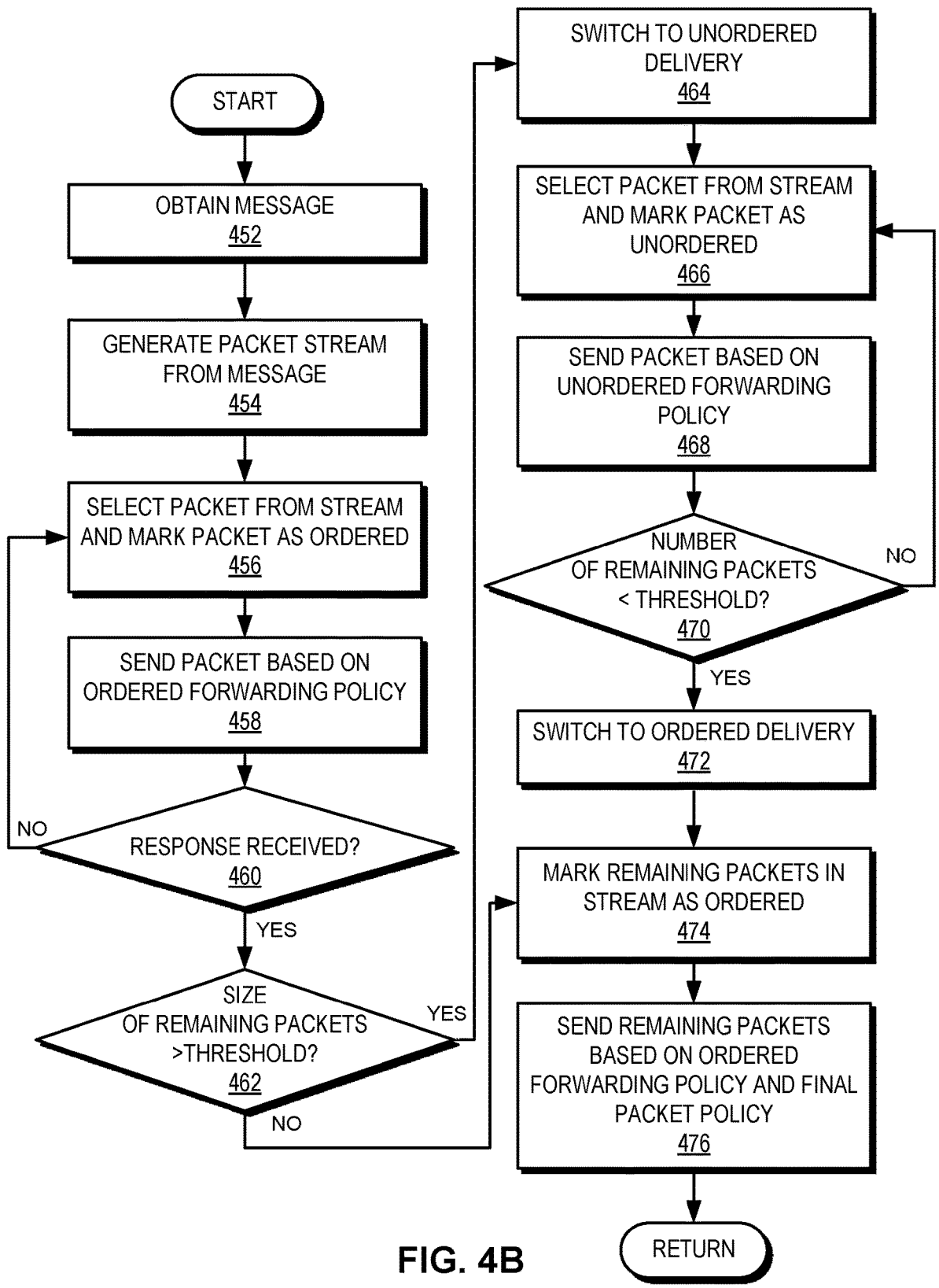
FIG. 4B shows a flow chart of an IOI packet forwarding process in a NIC.

FIG. 4B shows a flow chart of an IOI packet forwarding process in a NIC. During operation, the NIC can obtain a message (operation 452) and generate a packet stream for the packet (operation 454). The NIC can then select a packet from the packet stream and mark the packet stream as ordered (e.g., by setting a flag in the packet) (operation 456). Subsequently, the NIC can send the packet based on an ordered forwarding policy (operation 458). The ordered forwarding policy may dictate how an ordered packet might be forwarded via a network, such as a forwarding path in the network and corresponding forwarding parameters.

The NIC can then check whether a response has been received (operation 460). If the NIC has not received a response, the NIC can continue to select the next packet from the packet stream and mark the packet stream as ordered (operation 456). On the other hand, upon receiving a response, the NIC can determine whether the size of the remaining packets is greater than the threshold (operation 462), as described in conjunction with FIG. 4A. If the size of the sent packets is greater than the threshold, the NIC can switch to the unordered delivery (operation 464). Accordingly, the NIC can select the next packet from the packet stream and mark the packet stream as unordered (e.g., by not setting the flag in the packet) (operation 466). Subsequently, the NIC can send the packet based on an unordered forwarding policy (operation 468). The unordered forwarding policy may dictate how an unordered packet might be forwarded, such as load balancing and multi-path forwarding.

The NIC can then check whether the number of remaining packets is less than a threshold (operation 470). If the number of remaining packets is not less than the threshold, the NIC can continue to select the next packet from the packet stream and mark the packet stream as unordered (operation 466). On the other hand, if the number of remaining packets is less than the threshold, the NIC can switch to the ordered delivery (operation 472). If the size of the sent packets is less than or equal to the threshold (operation 462), the message can be too small for IOI. Accordingly, the NIC can mark the remaining packets in the stream as ordered (operation 474), and send the remaining packets based on the ordered forwarding policy and a final packet policy (operation 476). The final packet policy may dictate the final packet might be forwarded.

Figure 4C:
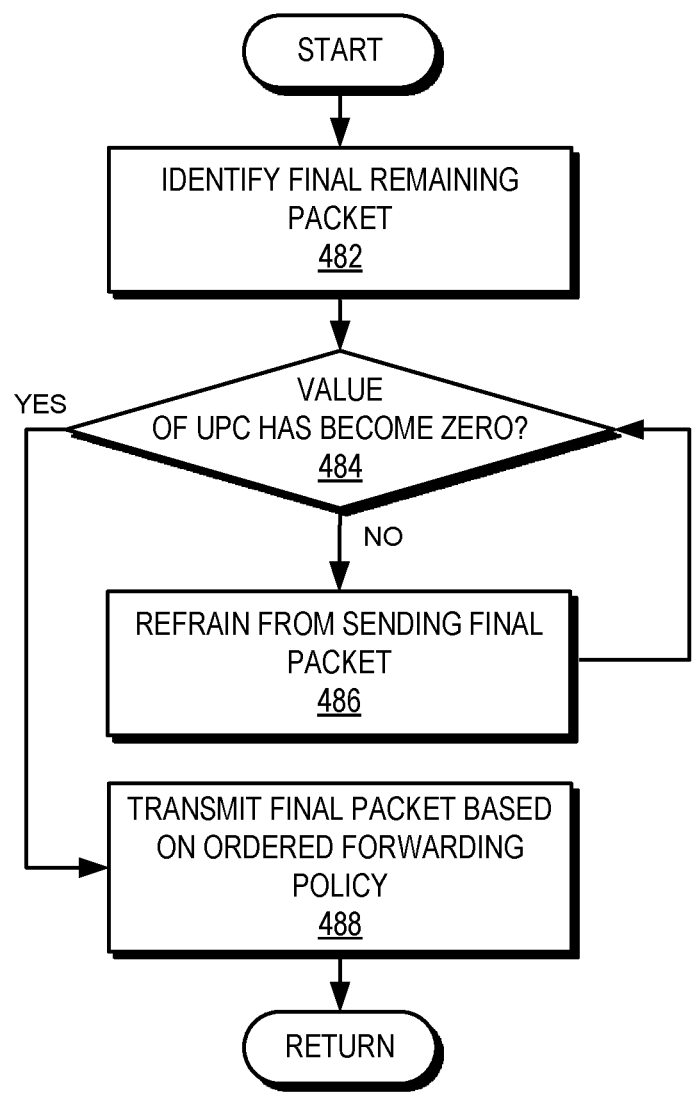
FIG. 4C shows a flow chart of an IOI packet forwarding process for the final packet in a NIC.

FIG. 4C shows a flow chart of an IOI packet forwarding process for the final packet in a NIC. This forwarding process can conform to the final packet policy. During operation, the NIC can identify the final remaining packet (operation 482) and determine whether the value of the UPC has become zero (i.e., responses for all unordered packets have been received) (operation 484). If the value of the UPC is not zero, the NIC can refrain from sending the final packet (operation 486) and continue to determine whether the value of the UPC has become zero (operation 484). On the other hand, if the value of the UPC has become zero, the NIC can send the final remaining packet based on the ordered forwarding policy (operation 488).

Exemplary Computer System

Figure 5:
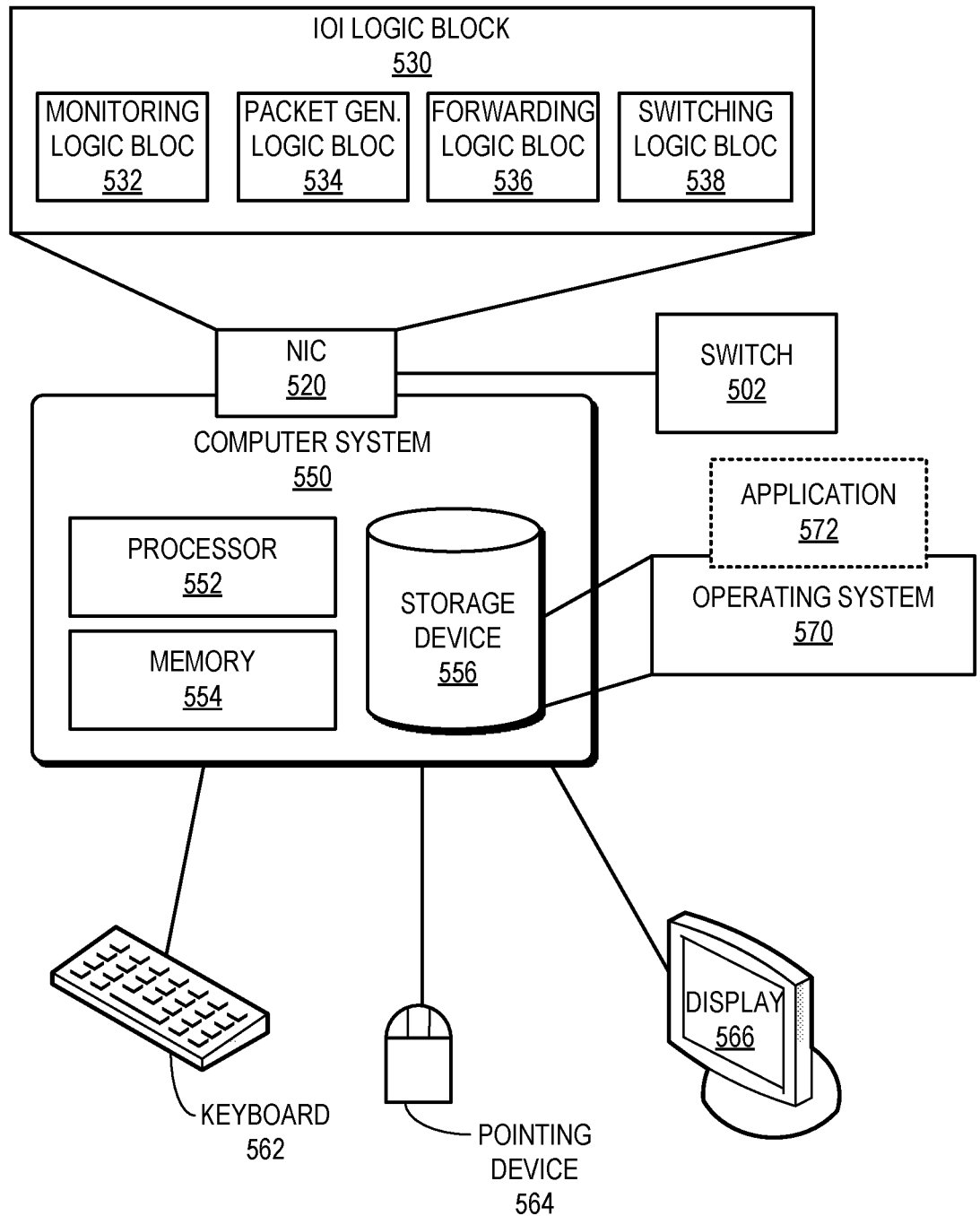
FIG. 5 shows an exemplary computer system equipped with a NIC that facilitates efficient packet forwarding.

FIG. 5 shows an exemplary computer system equipped with a NIC that facilitates efficient packet forwarding. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an RN logic block 530, as described in conjunction with FIGS. 3A and 3B. IOI logic block 530 can include a monitoring logic block 532, a packet generation logic block 534, a forwarding logic block 536, and a switching logic block 538. Monitoring logic block 532 can determine whether packets of a message invoke IOI forwarding.

Packet generation logic block 534 (e.g., in an MCU in NIC 520) can generate a packet stream from the message. Forwarding logic block 536 (e.g., in an OXE in NIC 520) can forward the packets of the message based on IOI forwarding, as described in conjunction with FIGS. 4B and 4C. Monitoring logic block 532 can also determine whether a response has been received for the initial packets. Monitoring logic block 532 may maintain the values for the OPC and UPC for the message. Switching logic block 536 (e.g., in an OXE in NIC 520) can determine whether to switch between the ordered and unordered deliveries for the IOI forwarding.

In summary, the present disclosure describes a NIC that facilitates efficient packet forwarding. The NIC can be equipped with a host interface, a packet generation logic block, and a forwarding logic block. The host interface may couple a host device. During operation, the packet generation logic block can obtain, via the host interface, a message from the host device and for a remote device. The packet generation logic block may generate a plurality of packets for the remote device from the message. The forwarding logic block can then send a first subset of packets of the plurality of packets based on ordered delivery. If a first condition is met, the forwarding logic block can send a second subset of packets of the plurality of packets based on unordered delivery. Furthermore, if a second condition is met, the forwarding logic block can send a third subset of packets of the plurality of packets based on ordered delivery.

The methods and processes described above can be performed by hardware logic blocks, modules, logic blocks, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
one or more processors; and
memory including computer code that when executed, causes the one or more processors to send packets of a message according to a prescribed ordered-delivery-at-message-boundary policy that utilizes both ordered delivery and unordered delivery of the message to improve performance while preserving order at boundaries of the message, the prescribed ordered-delivery-at-message-boundary policy comprising instructions to:
send an initial subset of the packets associated with an initial portion of the message based on ordered delivery;
in response to a first condition associated with the ordered delivery, send a middle subset of the packets associated with a middle portion of the message based on unordered delivery;
refrain from sending a last subset of the packets until the NIC has received responses for the unordered delivery; and
in response to a second condition associated with unordered delivery, send the last subset of the packets associated with a last portion of the message based on the ordered delivery.

2. The network interface controller of claim 1, wherein triggering the first condition comprises receiving, from a remote device that is an intended recipient of the message, a response for one of the initial subset of the packets.

3. The network interface controller of claim 1, wherein triggering the second condition comprises determining that a number of packets in the last subset of the packets is less than a second threshold.

4. The network interface controller of claim 3, wherein the second threshold indicates a number of outstanding packets in the initial subset of the packets and middle subset of the packets.

5. The network interface controller of claim 1, wherein the computer code when executed further causes the one or more processors to:
identify a final packet in the last subset of the packets; and
refrain from sending the final packet until receiving respective responses for all packets in the middle subset of the packets.

6. The network interface controller of claim 1, wherein the initial, middle, and last subsets of the packets are sent in a non-overlapping sequence.

7. The network interface controller of claim 1, wherein the computer code when executed further causes the one or more processors to:
maintain a first counter indicating a number of outstanding packets in the initial subset of the packets and last subset of the packets; and
maintain a second counter indicating a number of outstanding packets in the middle subset of the packets.

8. The network interface controller of claim 1, wherein the computer code when executed further causes the one or more processors to set a flag in a respective packet in the initial subset of the packets and last subset of the packets, wherein the flag indicates that an ordered delivery of the packets is required.

9. The network interface controller of claim 1, wherein the message corresponds to a remote direct memory access (RDMA) command.

10. The NIC of claim 1, wherein the boundaries of the message correspond with a size of the message or a number of the packets of a packet stream.

11. The NIC of claim 1, wherein the initial subset of the packets, the middle subset of the packets, and the last subset of the packets each correspond with indicators indicating that in-order delivery is strictly enforced.

12. The NIC of claim 1, wherein the initial subset of the packets correspond with a first set of sequence numbers that are less than a second set of sequence numbers corresponding to the middle subset of the packets and the last subset of the packets.

13. A method, comprising:
obtaining, via a host interface, a message from a host device and for a remote device; and
sending packets of the message according to a prescribed ordered-delivery-at-message-boundary policy that utilizes both ordered delivery and unordered delivery of the message to improve performance while preserving order at boundaries of the message, the prescribed ordered-delivery-at-message-boundary policy comprising:
sending an initial subset of the packets associated with an initial portion of the message based on ordered delivery,
in response to a first condition associated with the ordered delivery, sending a middle subset of the packets associated with a middle portion of the message based on unordered delivery,
refrain from sending a last subset of the packets until responses are received for the unordered delivery, and
in response to a second condition associated with unordered delivery, sending the last subset of the packets associated with a last portion of a message based on the ordered delivery.

14. The method of claim 13, wherein triggering the first condition comprises receiving, from the remote device, a response for one of the initial subset of the packets.

15. The method of claim 13, wherein triggering the second condition comprises determining that a number of packets in the last subset of the packets is less than a second threshold.

16. The method of claim 15, wherein the second threshold indicates a number of outstanding packets in the initial subset of the packets and middle subset of the packets.

17. The method of claim 13, further comprising:
   identifying a final packet in the last subset of the packets; and
   refraining from sending the final packet until receiving respective responses for all packets in the middle subset of the packets.

18. The method of claim 13, further comprising:
   maintaining a first counter indicating a number of outstanding packets in the initial subset of the packets and last subset of the packets; and
   maintaining a second counter indicating a number of outstanding packets in the middle subset of the packets.

19. The method of claim 13, further comprising setting a flag in a respective packet in the initial subset of the packets and last subset of the packets, wherein the flag indicates that an ordered delivery of the packets is required.

20. The method of claim 13, wherein the message corresponds to a remote direct memory access (RDMA) command.

\* \* \* \* \*